United States Patent [19]

Stern et al.

[11] Patent Number: 5,653,782
[45] Date of Patent: Aug. 5, 1997

[54] PROCESS FOR THE MANUFACTURE OF SULFUR-CONTAINING FERTILIZERS

[75] Inventors: Shmuel Stern; Eli Ben-Yoseph, both of Haifa, Israel

[73] Assignee: Rotem Amfert Negev Ltd., Dimona, Israel

[21] Appl. No.: 568,153

[22] Filed: Dec. 6, 1995

[30] Foreign Application Priority Data

Dec. 26, 1994 [IL] Israel ......................... 112153

[51] Int. Cl.$^6$ ........................................ C05B 17/00
[52] U.S. Cl. ................ 71/53; 71/32; 71/33; 71/64.02
[58] Field of Search ...................... 71/32, 33, 53, 71/64.02

[56] References Cited

U.S. PATENT DOCUMENTS

| | | | |
|---|---|---|---|
| 2,097,446 | 11/1937 | Claiborne, Jr. et al. | |
| 2,161,035 | 6/1939 | Gilbert . | |
| 3,177,062 | 4/1965 | Hignett et al. . | |
| 3,576,613 | 4/1971 | Fleming | 71/28 |
| 3,580,715 | 5/1971 | Dilday | 71/28 |
| 4,026,696 | 5/1977 | Young | 71/28 |
| 4,032,319 | 6/1977 | Smith et al. . | |
| 4,113,842 | 9/1978 | Mc Cullough et al. | 423/308 |
| 4,154,593 | 5/1979 | Brown et al. | 71/33 |
| 4,334,906 | 6/1982 | Young | 71/33 |
| 4,842,790 | 6/1989 | Nunnely | 264/117 |
| 5,152,821 | 10/1992 | Walter | 71/33 |

OTHER PUBLICATIONS

Perry et al. Perry's Chemical Engineers Handbook, 6th ed., pp. 21–15 1989.
"Water Degradable Sulphur/Anhydrite Pellets for Fertiliser Use" *New Zealand Journal of Science*, vol. 23, No. 4 (1980); pp. 371–382.
Abstract of Paper entitled "Modified Sulfur Coated Urea" by R. Jerome Timmons, read before the 198th ACS National Meeting, Sep. 15–20, 1989.

*Primary Examiner*—Deborah Jones
*Assistant Examiner*—Amy M. Harding
*Attorney, Agent, or Firm*—Morgan & Finnegan LLP

[57] ABSTRACT

The invention relates to a process for obtaining sulfur-containing fertilizers. According to the invention, a substrate containing fertilizer particles is heated to a temperature above the melting point of sulfur and subsequently by admixing with the sulfur, the latter is melted by the heat provided by said preheated fertilizer particles, producing a homogeneous coating on the fertilizer particles. According to a preferred embodiment the temperature at which the fertilizer particles are heated will be in the range of 140° C. to 280° C. Other materials may be added either into the phosphate or to the resulted mixture, having the purpose to modify the physical nature of the sulfur. The sulfur availability from the coated fertilizer particles may be adjusted by varying the temperature at which the fertilizer particles are heated. Typical examples of fertilizers useful for the process are: phosphate rock, superphosphate, monopotassium phosphate, triple superphosphate and potassium chloride.

15 Claims, No Drawings

PROCESS FOR THE MANUFACTURE OF SULFUR-CONTAINING FERTILIZERS

The present invention relates to a process for making fertilizer compositions containing sulfur. More particularly, the invention relates to a process for making fertilizer compositions containing the sulfur in a most available form.

BACKGROUND OF THE INVENTION

There is a growing world wide demand for fertilizers containing element sulfur, since it was found that deficiencies of this element have created low crop yields. This sulfur deficiency in soils has developed over the last 20–30 years, due to a strict pollution control in most countries. Accordingly, the amount of $SO_2$ has been drastically reduced in power station stacks, as well as due to the use of concentrated fertilizers containing little or no sulfur content.

There is a demand for a fertilizer containing about 10% sulfur, with maximum content of plant nutrients, based on water soluble $P_2O_5$ (Triple Superphosphate), partially acidulated phosphate rock, monoammonium phosphate, diammonium phosphate and on phosphate rock. Generally, it is suggested that the sulfur should be in a finely dispersed state. A common accepted New Zealand specification states that about 50% should pass 100 mesh screen (150μ) and the coarsest fraction should be below 500μ for cool climates such as in New Zealand where much research was performed on the use of sulfur as a fertilizer. Elemental sulfur is preferred since it is not leached out of the soil as are sulfates, especially in humid climates, and since it is of a much higher concentration than other sulfur containing compounds. Sulfur with a particle size distribution as described above, has also slow release characteristics where the finer fraction is available during the first growing season, and the coarser fraction becomes available over the years. Elemental sulfur has some additional advantages in fertilizers:

it acts as a fungicide against certain microorganisms;
it assists the decomposition of plant residues;
it improves phosphorus utilization and reduces the pH of alkaline and calcareous soils.

There are a number of publications, including patents, which describe methods for obtaining sulfur-containing fertilizers. Various embodiments are claimed, but in principle most of the known methods are based on the incorporation of melted sulfur into the respective fertilizer. In this manner, the previously melted sulfur is solidified on the fertilizer particles. Optionally, the mixture is subsequently pelletized to impart to the granules some resistance to fracture. Thus according to the U.S. Pat. No. 2,097,446 the melted sulfur is mixed with phosphate rock particles and the resulted mixture is pelletized at a temperature in the range of between 220° C. and 260° C. A variation to this process is disclosed in the U.S. Pat. No. 2,161,035, wherein the bonding action of sulfur on the fertilizer particles is improved by the adjustment of the pH of the melted sulfur, by the addition of a mineral acid, prior to its mixing with the phosphate rock particles.

In the U.S. Pat. No. 3,177,062, it is mentioned that there are serious difficulties in the use of melted sulfur to obtain homogeneous fertilizer pellets or granules. Accordingly, a process is disclosed which avoids the use of melted sulfur. The process comprises blending pulverized phosphate rock with particulate elemental sulfur, granulating the resulting mixture to obtain a fraction with a size particles on the range of minus 10 to plus 20 mesh and subsequently stabilizing the granules by their heating at a temperature of about 150° C.

In the U.S. Pat. No. 4,032,319 there are described composite fertilizers containing a non-uniform discontinuous, particulate core material in a water-permeable coating comprising sulfur. The method for their production involves the contact of the fertilizer particles with melted sulfur at a temperature at which the coating of said sulfur has an insufficient flow to form a continuous uniform coating, thus providing bare areas through which a hydrolytric attack takes place. Optionally, the coating contains a particulate modifier material which swells in the presence of water thereby promoting the release of the fertilizer Examples of such particulate modifier material are gypsum, potassium salts, bentonite, soluble salts of copper, zinc, borax, manganese and iron.

Among the disadvantages of the conventional methods it should be mentioned the requirement of melted sulfur, to use sulfur dust which is undesirable in its handling. Also, as mentioned in a review by H. P. Rothbaum et al (New Zealand Journal of Science, 1980, vol 23, 377) explosion hazards which might occur, are always due to sulfur dust which is inflammable. As known the use of melted sulfur itself carries with it the danger of fires in driers and explosions in dispatch areas. Another disadvantage is that upon the solidifying of the melted sulfur on the fertilizer particles, a broad range of particle sizes and even lumps might be formed together—or even separately—with the fertilizer particles. In order to obtain a more homogeneous mixture, a further grinding and screening might be required.

In another report by Charleston A. G. (Fert. Res. 1987, 11.2, 185–92) it is suggested to add melted sulfur to a solution of phosphoric acid to produce a slurry containing fine sulfur particles, to be used subsequently for the acidulation of phosphate rock.

The above brief review of some prior art references indicates that up to now there is no a simple method for obtaining sulfur-containing fertilizers which can be used without a further grinding and homogenization of the mixture obtained, operations which are relatively quite expensive and involve the danger of explosion. The problem has become recently more urgent, when a sulfur deficiency is noticed and this fertilizer nutrient began to be recognized as the fourth main element along the nitrogen, phosphorus and potassium elements. Also, according to the known methods, the losses of sulfur and its oxidation are unavoidable during the drying stage of the mixture. Other problems which have to be solved are connected with the handling of the powdered material, feeding it to the reactor and drying the final product.

It is an object of the present invention to provide a simple method for obtaining sulfur-containing fertilizers. It is another object of the present invention to provide a simple method for the utilization of waste materials for obtaining sulfur-containing fertilizers. It is another object of the present invention to provide a simple method for obtaining sulfur-containing fertilizers in which the sulfur is homogeneously distributed throughout the mass. It is another object of the present invention to obtain sulfur-containing fertilizers that do not give rise to dust during handling and storage and therefore are not subject to explosion and fire hazards. It is yet another object of the present invention to provide a simple method for obtaining sulfur-containing fertilizers which can be implemented in any fertilizer plant without requiring any accessory equipment for grinding the sulfur.

BRIEF DESCRIPTION OF THE INVENTION

The invention consists in a process for obtaining sulfur-containing fertilizers wherein a substrate containing fertilizer particles is heated to a temperature above the melting point of sulfur and subsequently the sulfur is added, being melted by the heat provided by said preheated fertilizer particles and thoroughly mixed, thus producing a homogeneous coating on said particles. The optimal temperature at which the fertilizer particles have to be heated will depend on the amount of sulfur to be added, being at least 10° C. above the melting point of sulfur generally being in the range of 130° to 280° C.

DETAILED DESCRIPTION OF THE INVENTION

The term of coating as utilized in the present specification implies also the case of coating internal surface of the fertilizer particles in which the molten sulfur does penetrate during the mixing. The preferred temperature range for heating the fertilizer particles is between 140° to 180° C. At this range, there is a sufficient gradient between the temperature at which the sulfur becomes melted, to make up for heat dissipated to the particles, heat losses to the surroundings and the latent heat required for the sulfur melting.

Due to low moisture content of the fertilizer obtained after heating before sulfur addition, some tendency to dust formation may exist. This may be alleviated by known conventional means, such as addition of small amounts of moisture, viscous oils, and/or waxes to the material while it is being cooled, or after having reached an ambient temperature. Similarly, certain materials may be incorporated together with the sulfur addition, before the sulfur, or added to the mixture, which modify the physical nature of the sulfur, by acting as plasticizers, lubricants, stabilizers, or wetting agents. This addition will allow the sulfur to spread more easily over the surface of the treated fertilizer. Examples of such materials are described in a paper by J. Timmens (Paper No. 23, read before the 198th ACS National Meeting, Sep. 15-20, 1989, on "Modified Sulfur coated urea)".

The mixing time at the above preferred temperature determines the amount of the sulfur melt and accordingly the thickness of the coating layers, the efficiency of spreading over the fertilizer particles as well as the extent of penetration into the pores of the particles. The effective particle size of the sulfur is determined by the temperature at which the sulfur contacts the fertilizer particles as well as the mixing time between the two materials. Of course, the particle size of the material and its pore size distribution are among the main factors which determine the particle size distribution of the sulfur and accordingly its availability to the soil.

The resulting material has the characteristic advantage that the sulfur while being finely dispersed, is firmly attached to the fertilizer substrate and therefore has no tendency to be released as dust, to cause losses of nutrient and the danger of explosions. Any fines in the sulfur used will readily melt and become attached to the fertilizer particles. Therefore, the sulfur-containing fertilizers produced by the present invention will be substantially free from sulfur dust. Accordingly, the sulfur forming the coating will possess a high surface area arid will be immediately available to the soil as a sulfur-nutrient, being most rapidly oxidized by the soil microbiological system. Also, the coated fertilizer particles are harder, possessing a higher strength and thus will be more resistant to abrasion compared with the original fertilizer particles. Accordingly, less dust is formed when shipping this product in bulk and small losses of material, due to abrasion, are involved.

The sulfur availability from the coated fertilizer particles may be adjusted by varying the temperature at which the substrate with the fertilizer particles is heated, prior to the introduction of sulfur, as well as the time of contact between the sulfur and the heated substrate of fertilizer particles. In this manner it is possible to prepare a sulfur fertilizer which supplies sulfur immediately or over a prolonged period of time.

It was found that by using the process according to the present invention, most of the sulfur is in a finely divided state and a large surface area, which cause that its availability is substantially increased, without any grinding operation. This is an important advantage over the prior art methods in which this result could be achieved only by grinding, and then granulating the mixture of sulfur with the fertilizer materials. Microscopic examination of the small sulfur-phosphate rock particles obtained, showed that the sulfur added formed a coating around the phosphate particles and also penetrates through the pores and cracks of the phosphate particles.

The fertilizer particles to be admixed with the sulfur may comprise particles of any desired size but obviously they should be somewhat smaller than those of the described finished particle size. Generally, the particle size of the fertilizer should be in the range of between 4 to 200 mesh (USSS scale) in which case a greater contact surface between these particles and the sulfur will be achieved. Good results are obtained by using about 2% to 40% of sulfur for a fertilizer having a particle size between about 4 to 200 mesh (Tyler scale). Less than 2% sulfur does not provide to the soil sufficient sulfur for economic reasons, but may have additional benefits, such as providing specific properties to the fertilizer such as: anticaking, strengthening of the fertilizer particles and reducing the dust.

The sulfur when applied according to the invention, as a solid to the hot fertilizer, is spread uniformly over the whole surface. Thus even with a low addition of 0.1%, some benefit may be gained, in addition to raising the sulfur content, which in this case is quite negligible. With finely divided particles of, phosphate, more than 40% of sulfur may be introduced, but most preferably up to 20%, this being held in place by the large surface area of the solid particles of phosphate. Of course, in case of the high contents of sulfur, it will be slowly released into the soil, fact which has its benefit by itself.

The fertilizer to be used, may be of any known common fertilizer which remains solid at the temperature to which must be heated prior to the addition of sulfur. Examples of such fertilizers include, but are not limited to, normal superphosphate, triple superphosphate, mono-calcium phosphate, rock phosphate, partially acidulated rock phosphate, diammonium phosphate, monopotassium phosphate, potassium chloride, ammonium polyphosphate, potassium polyphosphate, potassium metaphosphate, potassium sulfate as well as mixtures of various fertilizers such as those set forth above with each other and/or together with inert fillers, microelements or adjuvant materials having no nutrient value. It should be pointed out that with some phosphate fertilizers, such as triple superphosphate, the presence of sulfur also assists its availability in the soil.

According to another embodiment of the present invention, waste materials can be up-graded producing useful fertilizers. Waste materials for this purpose are defined as those that cannot be utilized or sold because their physical or chemical composition does not conform to the specification set out for the normal product. These include materials such as fines obtained in processing of phosphate rock or potash (KCl), and which chemically are excellent fertilizers with a very high availability in the soil for plants, but which cannot be transported in normal bulk shipments due to their finely divided state, and which would cause pollution in excess of the accepted limit.

The sulphur to be used may be either such as mined, or as obtained in sulphur filters, where impurities present are removed in order not to interfere the burning of sulphur in the production of sulphuric acid, and where the sulphur contains excessive impurities and which could only be removed by additional, and costly processing. The sulfur from such filters generally contains about 70% S, calcium carbonate and bituminous materials. Another source which may be used, is natural sulfur reach in mineral impurities such as pumice. These materials may be used in the method according to the present invention for producing sulphur-containing fertilizers. Moreover, the addition of sulphur generally improves the physical condition of such materials, the sulphur causing partial agglomeration of the fines treated, thus improving the flow properties and reducing the dustiness of the respective materials. When mixing hot phosphate rock fines (200–600 mesh), with such waste sulfur, the sulfur is transferred from the filter cake particles to said fines, provided that the mixing time is sufficient to heat the filter cake and enables said transfer in order to obtain a uniform content of sulfur through all the material. Lumps remaining from the filter cake, may be removed by screening the product obtained.

It was found that the surface area of the sulfur on the phosphate is very large. As known this is a decisive factor for its usefulness as an improved fertilizer and as an acidulant for the soil, or when associated with solid particles such as phosphate rock. Measurements on surface area were carried out on the 2600 Particle Sizer Instrument (produced by Malvern Instrument, Spring Lane, Worcester, U.K.) with the insoluble residues from phosphate rock (PR), granulated triple superphosphate (GTSP) and partially acidulated phosphate rock (PAPR). The results obtained are described in the Examples given in the specification. In this manner the fertilizers fines particles which are generally considered as waste, are converted into excellent fertilizer products with improved physical and chemical properties.

The treatment of KCl and other soluble fertilizers fines with sulfur according to the present invention, will avoid the problems of caking and absorption of moisture, and confer better flowability and storage properties than the fines of fertilizers which are not treated.

Another aspect of utilization the phosphate rock fines, treated according to the present invention, is their use as an effective fertilizer without requiring the addition of a mineral acid. This is due to the intimate contact created in the method between the phosphate rock particles and the sulfur. The large surface area obtained permits the soil bacteria to oxidize rapidly the sulfur into the corresponding acid and thus converting the phosphate rock into available plant nutrients for prolonged periods of time. This is most advantageous for rainy areas, the sulfur and phosphorus nutrients not being leached out immediately, thus becoming available as the growing plant needs it.

The surface area and the properties of the fertilizer substrate affect considerably the sulfur coating. Thus for instance, granules of phosphate rock particles with a diameter of 2–5 mm have a much thicker coating than phosphate rock of 0.5 mm diameter for the same weight of sulfur added.

The time of contact between the hot substrate and the solid sulfur as well as the temperature will determine the ultimate particle size and surface area. Therefore, it will be possible to regulate the particle size of the coated sulfur as well as the rate of the release into the soil according to a specific requirement.

One of the advantages of the process according to the present invention is its flexibility, enabling to obtain the desired sulfur-containing fertilizer according to a specific requirement. This is a result of the various parameters which can be changed in order to obtain a broad range of products with various properties of solubility, availability and concentrations.

The method according to the present invention is very simple and may be carried out in any fertilizer plant. The fertilizer particles are heated in a conventional vessel which can be heated; such as pug mill, rotary drum, ribbon mixer, or any other suitable mixing device, flash dryer, or rotary dryer, with or without lifters. To the hot vessel, sulfur is added and mixed with the hot phosphate or hot fertilizer. According to a preferred embodiment two distinct stages are involved. In the first stage the solid is heated in a suitable vessel, such as a rotary dryer, with or without lifters, a flash dryer, or a fluidized bed. In a second stage, the heated solid is conveyed to a second mixing vessel, such as a pug mill, where the sulfur is added the temperature being above the melting point in the range of between 130° C. to 280° C. During the mixing, the sulfur is melted gradually by the contact with the hot fertilizer and thus a continuous uniform coating of sulfur is formed on the fertilizer particles. The coating thickness may be adjusted by changing the temperature of the vessel, an increase in temperature imparting more fluidity to the molten sulfur. The particles size of the sulfur to be introduced is not critical and actually any particle size may be used provided the mixing vessel is able to physically mix the sulfur with the fertilizer particles to be coated. After mixing for about 5 to 10 minutes at the hot temperature (130° to 280° C.), the coated fertilizer particles are cooled by passing air through the material, at the exit of the vessel or another vessel such as a fluid bed, rotary drum or any other conventional cooling device. The material is cooled to a temperature below the melting point of sulfur and eventually to ambient temperature for storage. The product obtained is harder, of a higher strength and more resistant to abrasion than the original fertilizer used. The invention will be hereafter illustrated by the following Examples being understood that the Examples are not limiting the scope of the invention being presented only for a better understanding of the process since many variations may be envisaged by a person skilled in the art.

In the Examples, the concentrations are given by weight per cent, unless otherwise stated.

EXAMPLE 1

Use of phosphate rock as substrate.

Phosphate rock from ZIN (Israel) containing 32.3% $P_2O_5$, was heated to a temperature of 132° C. in a batch rotary dryer. The particles size of the phosphate was between 100μ to 2 mm diameter, with the following screen analysis:

| | |
|---|---|
| +20 mesh: 1%; | 20–100 mesh: 70.30%; |
| 100–200 mesh: 23.5%; | –200 mesh: 5.2%; |

Elemental sulfur prills, 10% by weight, with diameter up to 2 mm were added in the first section of the dryer and rotated for about 5 minutes, while hot. The resulted mixture was cooled by passing air through the dryer.

The resulted phosphate product was found to be coated by a homogeneous film of sulphur.

The phosphate was dissolved in dilute HCl and the acid insoluble solid residue was determined by laser light diffraction on a Malvern particle size analyzer suspended in water.

The average diameter of the particles size D50, was found to be about 10 microns, containing about 1% by weight S.

EXAMPLE 2

Use of Granulated Triple Superphosphate (GTSP) as substrate.

GTSP produced in the plant of Rotem Amfert Negev Ltd. (Israel) with granules of 2–5 mm. in diameter, was heated in a rotary dryer to 140° C. Elemental sulfur in amount of 10% of the GTSP was added in the same way as in the previous example.

The crushing strength of the granules after heating to 140° C. decreased by about 10%, from 4.8 to 4.5 kg, but with the added sulfur, the strength rose by about 30% to 5.9 kg. Similarly, the amount of weak granules with a strength below 3.5 kg increased from 22% in the original GTSP to 36% after heating to 140° C., but dropped to 14% with the added 10% sulfur.

EXAMPLE 3

Use of phosphate rock fines as substrate.

An amount of 5 kg phosphate rock 25–70μ in diameter, were heated to 200° C. in a non-flighted rotary drum. This was transferred to a pug mill, where 2.5 kg sulphur was added having a particle size of below 2 mm. The material was cooled with agitation to room temperature. The phosphate particles were found to be uniformly covered with a thin layer of sulphur, as observed under an optical microscope of polished sections. The particles were partially agglomerated, and flowed better than the original material.

The product containing 33% sulfur, was compacted into a a cylindrical disc (30 mm diameter and 15 mm thickness) in a laboratory press under 1000 kg pressure. A mixture of this phosphate with 10% by weight of bentonite, was compacted in the same manner and the strength resulted was about 15 kg.

The mixture was introduced in water where the material disintegrated rapidly into a finely dispersed mixture. A highly efficient fertilizer resulted, which upon being placed into moist soil it was dispersed and thus became available to soil microorganisms. The sulfur readily oxidized to sulphuric acid, which in turn increased the availability of the phosphate rock and thus supplied the needs of phosphorus and sulfur to the plant.

EXAMPLE 4

The availability of sulfur-phosphate rock.

The sulfur coated phosphate, as in Example 2, was mixed with 2 parts of the same untreated rock, but without the bentonite and was compacted in the same manner.

The resulted compacts were crushed, and the particles 20/28 mesh were placed in a soil, moistened to field capacity and incubated for three weeks at 30° C.

About 3% of the soil, which had been fertilized with sulfur one year previously and had thus developed sulfur-oxidizing bacteria was also added. About 53% of the added sulfur and 100% of the added phosphorus had been converted to soluble $SO_4/P_2O_5$ at the end of the incubation period. The fertilizer which contained 30% $P_2O_5$ and 10% elemental sulfur, had thus been made available in a relatively short period of time.

EXAMPLE 5

Use of a P-K fertilizer as substrate.

An amount of 6.7 kg. of the same phosphate fines as in Example 3 containing 33% Sulfur, was compacted with 3.3 kg. of KCl in the same cylindrical disc. The radial crushing strength was determined and this is shown Table 1 below.

This mixture is a highly efficient fertilizer, since the KCl dissolves readily in the soil solution and thus disperses the phosphorus and sulfur.

This fertilizer analyzing about 20% $P_2O_5$, 20% $K_2O$ and 20% sulfur, will supply all these elements in an available form, and at a high concentration as strong granules. For comparison, the phosphate fines not containing sulfur were compacted in the same sized disc but in this case the crushing strength was only about 4 kg.

TABLE 1

Compaction of Phosphate Rock: KCl, Bentonite and Sulfur.

| Expt. No. | Materials (kg.) I | II | III | Crushing strength (kg.) |
|---|---|---|---|---|
| 1 | 100 FOE | — | — | 4.0 |
| 2 | 100 FOE | — | — | 3.9 |
| 3 | 90 FOE | 33S | 10Z | 14.6 |
| 4 | 67 FOE | 33S | 33KCl | 17.8 |
| 5 | 33 FOE | 33S | 67KCl | 12.2 |

Note:
FOE = Flotation Product Oron Fines, (produced by Rotem Amfert Negev Ltd.);
33S = Material containing 33% sulfur (S);
Z = Bentonite;
KCl = Potassium Chloride produced by Dead Sea Works Ltd.

EXAMPLE 6

Use of waste sulfur.

In another experiment carried out in the same manner as in Example 2, the sulfur was replaced by 50 g of waste sulfur taken from the filter of a sulphuric acid plant, consisting of 67% sulfur and 33% impurities, and crushed to pass a 4 mesh screen (approx. 5 mm).

The particles size of the sulfur were very small possessing a large surface area and thus the resulted mixture compacted to a hard solid.

EXAMPLE 7

The strengths of S-coated GTPS granules.

Samples of Granulated Triple Superphosphate (GTSP) produced at the plant in Rotem (Israel) containing 47% $P_2O_5$ (on dry basis), with granules having a size diameter in the range of between 2 to 3 mm were heated in a rotating drum at a temperature in the range of between 130° C. to 160° C.

Elemental sulfur, at various quantities were added on the surface of the GTSP granules. The rotating of the drum was continued for about one minute and the material obtained was cooled by passing a stream of air through the dryer.

The product obtained was found to be coated by a continuous film of sulfur and some of the sulfur was found to be inside the granules.

The analyses of three samples carried out at 3 different temperatures are give in the following Table 2.

TABLE 2

| Analyses of three samples of GTPS coated by sulfur. | | | |
|---|---|---|---|
| | Sample 1 | Sample 2 | Sample 3 |
| GTSP Temp. (°C.) | 130 | 143 | 160 |
| % total $P_2O_5$ | 40.9 | 41.6 | 41.0 |
| % Citrate sol.($P_2O_5$) | 38.8 | 39.2 | 37.8 |
| % Water soluble | 37.5 | 37.2 | 36.8 |
| % Free acid as $P_2O_5$ | 1.1 | 1.1 | 1.1 |
| % Total Sulfur | 14.4 | 15.4 | 16.3 |
| % $SO_4$ | 6.5 | 6.4 | 6.1 |
| % $H_2O$ | 1.5 | 1.2 | 1.3 |

As a result of the coating with sulfur, the strength of the granules was increased from 6.9 to 8.7 Kg/granule. Samples of the sulfur-coated of GTSP were dissolved in dilute HC7 and the acid insoluble solid residue (the sulfur material) was analyzed by a laser light diffraction on a Malvern particle size analyzer. The average diameter of the particles, $D_{50}$ was found to be about 30 microns.

We claim:

1. A process for making sulfur-containing fertilizer comprising heating fertilizer particles at a temperature above the melting point of sulfur, said fertilizer particles being selected from the group consisting of a phosphate and a potassium salt; adding sulfur to said preheated fertilizer particles, the added sulfur being melted by the heat provided by said preheated fertilizer particles and thoroughly mixing therewith, said molten sulfur penetrating into the pores of the fertilizer particles and being distributed throughout said fertilizer particles, producing granules of fertilizer with a homogeneous coating of sulfur on said particles and on internal surfaces of said particles in which the molten sulfur has penetrated during mixing, said particles possessing a higher strength than the particles of the starting fertilizer particles.

2. A process according to claim 1, wherein the fertilizer particles are heated at a temperature which is at least 10° C. above the melting point of sulfur.

3. A process according to claim 1, wherein the fertilizer particles are heated at a temperature in the range of 130° C. to 280° C.

4. A process according to claim 1, wherein the fertilizer particles are heated at a temperature in the range of 140° C. to 180° C.

5. A process according to claim 1, wherein the sulfur forming the coating on the fertilizer particles possesses a high surface area with a particle size below 2 mm.

6. A process according to claim 5, wherein the thickness of the coating layer and the sulfur particles size are adjusted by varying the temperature at which the fertilizer particles are heated.

7. A process according to claim 6, wherein the thickness of the coating layer and the sulfur particles size are adjusted by varying the time of contact between the sulfur and fertilizer particles.

8. A process according to claim 1, wherein the particles size of the fertilizer is in the range of 4 to 200 mesh.

9. A process according to claim 1, wherein the amount of sulfur is in the range of between 2% to 40% of the fertilizer particles.

10. A process according to claim 1, wherein the amount of sulfur is in the range of between 5% to 15% of the substrate containing the fertilizer particles.

11. A process according to claim 1, wherein the fertilizer is selected from the group consisting of normal superphosphate, triple superphosphate, monocalcium phosphate, rock phosphate, partially acidulated rock phosphate, diammonium phosphate, mono-potassium phosphate, ammonium polyphosphate, potassium chloride, potassium polyphosphate, potassium sulfate, potassium metaphosphate as well as mixtures thereof, optionally together with inert fillers, microelements or adjuvant materials having no nutrient value.

12. A process according to claim 11, wherein the fertilizer particles consist substantially of fines.

13. A process according to claim 12, wherein said fines are agglomerated and compacted after mixing with the solid sulfur particles.

14. A process according to claim 1, carried out in two subsequent reactors, in the first one preheating the fertilizer particles and in the second reactor mixing the preheated fertilizer particles with the sulfur particles.

15. A process according to claim 14 wherein the reactors are selected: from fluidized bed reactor, rotary drum, flash dryer, ribbon mixer and pug mill.

* * * * *